(12) United States Patent
Spinnler et al.

(10) Patent No.: US 6,608,873 B1
(45) Date of Patent: Aug. 19, 2003

(54) METHOD AND APPARATUS FOR DETECTING CPM-MODULATED INFORMATION SYMBOLS

(75) Inventors: Bernhard Spinnler, Munich (DE);
Berthold Lankl, Munich (DE);
Johannes Huber, Langensendelbach (DE)

(73) Assignee: Siemens Mobile Communications S.p.A., Milan (IT)

( * ) Notice: Subject to any disclaimer, the term of this patent is extended or adjusted under 35 U.S.C. 154(b) by 0 days.

(21) Appl. No.: 09/257,115

(22) Filed: Feb. 25, 1999

(30) Foreign Application Priority Data

Feb. 26, 1998 (EP) .............................................. 98830105

(51) Int. Cl.$^7$ .......................... H03D 1/00; H04D 27/06
(52) U.S. Cl. ...................... 375/343; 375/233; 375/341; 375/350
(58) Field of Search ................................ 375/234, 233, 375/232, 341, 262, 343, 350; 714/795

(56) References Cited

U.S. PATENT DOCUMENTS

| | | | |
|---|---|---|---|
| 5,751,768 A | * 5/1998 | Guglielmi et al. | .......... 375/234 |
| 5,949,831 A | * 9/1999 | Coker et al. | ................. 375/341 |
| 6,026,121 A | * 2/2000 | Sadjadpour | ................. 375/262 |

OTHER PUBLICATIONS

K.–S. Chung, *Generalized Tamed Frequency Modulation and Its Application for Mobile Radio Communications*, IEEE Journal on Selected Areas in Communication, vol. SAC–2(4), pp. 487–497, Jul. 1984.

A. Svensson, et al., *Symbol Error Probability Behaviour for Continuous Phase Modulation with Partially Coherent Detection*, International Journal on Electronics and Communication (AEÜ), vol. 40(1), pp. 37–45, Jan. 1986.

S. Bellini,et al., *Non–coherent Detection of Tamed Frequency Modulation*, IEEE Transactions on Communications, vol. COM 32(3), pp. 218–224, Mar. 1984.

S. Bellini, et al., *Efficient Discriminator Detection of Partial–Response Continuous Phase Modulation*, IEEE Transactions on Communications, vol. COM–33(8), pp. 883–886, Aug. 1986.

G.D. Forney, Jr., *Maximum–Likelihood Sequence Estimation of Digital Sequencies in the Presence of Intersymbol Interference*, IEEE Transactions on Information Theory, vol. IT–18(3), pp. 363–378, May, 1972.

B.E. Spinnler, et al., *Design of Hyper States for Reduced-State Sequence Estimation*, International Journal of Electronics and Communications (AEÜ),vol. 50, pp. 17–26, Jan., 1996.

* cited by examiner

Primary Examiner—Phuong Phu
(74) Attorney, Agent, or Firm—Schiff Hardin & Waite

(57) ABSTRACT

Demodulation of CPM-modulated information symbols which are demodulated after being transmitted through an AWGN channel, using only partial whitened matched filtering, whereby finite pulses are produced which, however, are still accompanied by interferences in the form of remaining colored noise which can be approximately converted into white noise by a successive additional whitening filter so that the noise power will be minimized. For correcting the accompanying symbol interferences, a sequence estimation with reduced number of states follows.

14 Claims, 5 Drawing Sheets

METHOD AND APPARATUS FOR DETECTING CPM-MODULATED INFORMATION SYMBOLS

BACKGROUND OF THE INVENTION

The invention is related to methods for detecting CPM-modulated information symbols, as well as apparatus for practicing such methods. More particularly, the invention relates to such a method and apparatus in which the CPM signals are transmitted through an AWGN channel are incoherently demodulated by a frequency discriminator or differential demodulation into a signal which is then sampled with the symbol clock after having passed a whitened matched filter.

When transmitting digital signals, modulation methods are used which allow for reduction of the data rate and thereby allow for improved utilization of the transmission channels. Normally, data are transmitted by carrier frequencies, and at the receiver side, demodulation and decoding, respectively, of the noisy signals is required.

Continuous phase modulation methods (CPM) are mostly used in transmission systems which, apart from good bandwidth efficiency, must also be insensitive to non-linear distortions in the transmission chain. For an unsusceptible system concept it is, in particular with wireless transmission systems, e.g., radio link systems, often necessary that it can tolerate phase and frequency variations of the oscillators (for mixing, frequency shift, etc.) used in the transmission chain without bit errors appearing or even loss of synchronization. Such phase and frequency variations can be caused by temperature variations and/or mechanical effect influences on the oscillators. The system concept should allow such influences without serious degradation of the system properties in terms of bit error rate at a given signal-to-noise ratio.

Until now, coherent detecting methods with carrier restoration have been used, which, while exhibiting good properties concerning noise interference, suffer from loss of synchronization in the transmission system when sufficiently large frequency transitions occur in the superheterodyne oscillators, so as to produce entire bit error blocks. Such synchronization losses are caused when the phase-locked loop as used for carrier restoration becomes unlocked. In order to minimize such frequency transitions appearing in the oscillators, extensive measures will be needed, in particular in the radio link technique (frequencies up to 55 GHz).

Further to the coherent methods, non-coherent detecting methods are known, which either suffer from large degradation of the system properties in terms of noise, as compared to coherent methods (see K.-S. Chung, *Generalized Tamed Frequency Modulation and Its application for Mobile Radio Communications,* IEEE Journal on Selected Areas in Communications, Vol. SAC-2(4):487–497, July 1984), or which require unrealistically complicated measures for realizing them which cannot be practiced at this time (see A. Svensson, T. Aulin and C.-E. Sundberg, *Symbol Error Probability Behaviour for Continuous Phase Modulation with Partially Coherent Detection,* International Journal on Electronics and Communications (AEÜ), Vol. 40(1):37–45, January 1986). The large degradation of the method according to Chung is caused by the non-optimal conversion from the continuous range into the time-discrete range and to the colored noise at the input of the Viterbi algorithm suggested for correcting the symbol interferences.

The presently most promising attempts are based on the combination of a whitened matched filter (hereinafter called WMF) with succeeding correction of the symbol interferences caused by such filtering (see S. Bellini, M. Sonzogni and G. Tartara, *Non-coherent Detection of Tamed Frequency Modulation,* IEEE Transactions on Communications, Vol. COM 32(3): 218–224, March 1984, and further S. Bellini and G. Tartara, *Efficient Discriminator Detection of Partial-Response Continuous Phase Modulation,* IEEE Transactions on Communications, Vol. COM-33(8):883–886, August 1986). A drawback of such a method is that the WMF used can only be approximately calculated for particular frequency pulses. Furthermore, such WMF supplies at its output an infinite pulse which requires extensive measures in the following signal processing.

All of the foregoing articles are fully incorporated herein by reference.

SUMMARY OF THE INVENTION

An object of the invention is to provide for a method and an apparatus for detecting CPM-modulated information signals, allowing calculation for any frequency pulse and supplying at its output, in response to a frequency pulse, a minimum-phase finite pulse.

To that end, the invention provides a method and/or apparatus in which the demodulated CPM signal is subject only to partial whitened matched filtering, whereby the signal pulses decrease at the expense of remaining colored noise.

The concept of the invention resides in a modified draft solution of a whitened matched filter which combines the objects of a transition from the time continuum to discrete times without loss of information and the generation of un-correlated ("white") noise contributions, at the considered discrete times. The modification is that, for the beginning, the fact is being disregarded that the noise is colored as a consequence of using a frequency detector or a differential phase detector. Such filter, for that reason, later on called to be a partial whitened matched filter, is designed such that 1. the matched filter G*(f) is adapted only to the frequency pulse used, and
2. the whitening filter w(z) cancels the color of the noise caused by the matched filter.

This design is selected such that the partial WMF filter response to a frequency pulse will be a minimum phase pulse. The above mentioned remaining color of the noise interference is canceled as far as possible by means of a further minimum-phase whitening filter F(z) having a freely selectable finite order. This whitening filter F(z) is designed such that for a given filter order, the noise power at its output will be a minimum. Such a system provides, in response to a frequency pulse, an optimally decreasing minimum phase pulse which will be corrected by a typical sequence estimation method.

The additively superimposed noise will be minimal for the freely selectable pulse length. This allows for a simple choice between efficiency and complexity.

The sequence estimation can be performed with a simple sub-optimal method (DFSE, as shown by A. Duel and C. Heegard in their article *Delayed Decision-Feedback Sequence Estimation* in Proceedings of the 23rd Annual Allerton Conference on Communications, Contr. Comput., October 1985), fully incorporated herein by reference, or it can be performed by a more complex optimal method as, e.g., reported by B. E. Spinnler and J. B. Huber in their article *Design of Hyper States for Reduced-State Sequence Estimation* in International Journal of Electronics and Communications (AEÜ), Vol. 50: Jan. 17–26, 1996, fully incorporated herein by reference. The whitening filter F(z) can be designed in optimal manner for any frequency pulse. The advantages of incoherent detection (reduced requirements as to carrier phase constance) will be retained.

The invention is explained in more detail below in the following detailed description of the presently preferred embodiments with reference to the accompanying drawings.

BRIEF DESCRIPTION OF THE DRAWINGS

FIG. 3a shows an illustration for explaining the inventive whitening filter.

DETAILED DESCRIPTION OF THE PRESENTLY PREFERRED EMBODIMENTS

In the following description, it is assumed that out-of-band noise is removed from a continuous phase modulation (CPM) signal by a filter which is referred to as an intermediate frequency filter or IF filter. Moreover, it is assumed that the resulting signal is demodulated by a conventional frequency discriminator and a differential demodulation, respectively (cf. J. B. Anderson, T. Aulin and C.-E. Sundberg, *Digital Phase Modulation,* Plenum Press, New York, 1986), incorporated herein by reference. There are no limitations concerning the parameters of the modulation scheme as frequency modulating pulse, modulation index and symbol alphabet.

For the following derivation, it is assumed that the useful signal will not be distorted by the IF filter. Furthermore, it is assumed that the signal-to-noise ratio is large enough that the receiver operates above FM threshold and the model of linear superposition of signal and noise is valid. Because of the invariance of a complex gaussian process to rotation, this assumption can be proved to be exactly valid at least in the sampling instants if the IF filter is chosen adequately (see J. Huber, *Skriptum zur Vorlesung Nachrichtenüibertragung,* Lehrstuhl für Nachrichtentechnik, University Erlangen-Nuemberg, 1996), incorporated herein by reference. With these assumptions the signal $b_D(t)$ at the discriminator output reads $$b_D(t) = \sum_{k=-\infty}^{\infty} a[k]g_D(t-kT) + n'(t) \quad (1.1)$$

where the information symbols are denoted by $a[k] \in \{\pm 1, \pm 3, \ldots, \pm(M-1)\}$. The frequency modulating pulse, which extends over L symbol intervals, is denoted by $g_D(t)$ and conforms to the usual normalization $$\int_{-\infty}^{+\infty} g_D(t)dt = \frac{1}{2}. \quad (1.2)$$

The noise during transmission is modeled as additive white gaussian noise (AWGN). Hence, the additive noise n'(t) at the frequency discriminator output is colored and has a power spectral density which is proportional to $f^2$.

In the case of differential demodulation (FIG. 2), after demodulation the signal will be $$b_{DD}(t) = \sum_{k=-\infty}^{\infty} a[k]g_{DD}(t-kT) + n''(t), \quad (1.3)$$

where $$g_{DD}(t)=q(t)-q(t-\tau)$$

with $$q(t) = \int_{-\infty}^{t} g_D(t')dt' \text{ and } \tau \text{ arbitrary.} \quad (1.4)$$

Figure 1:
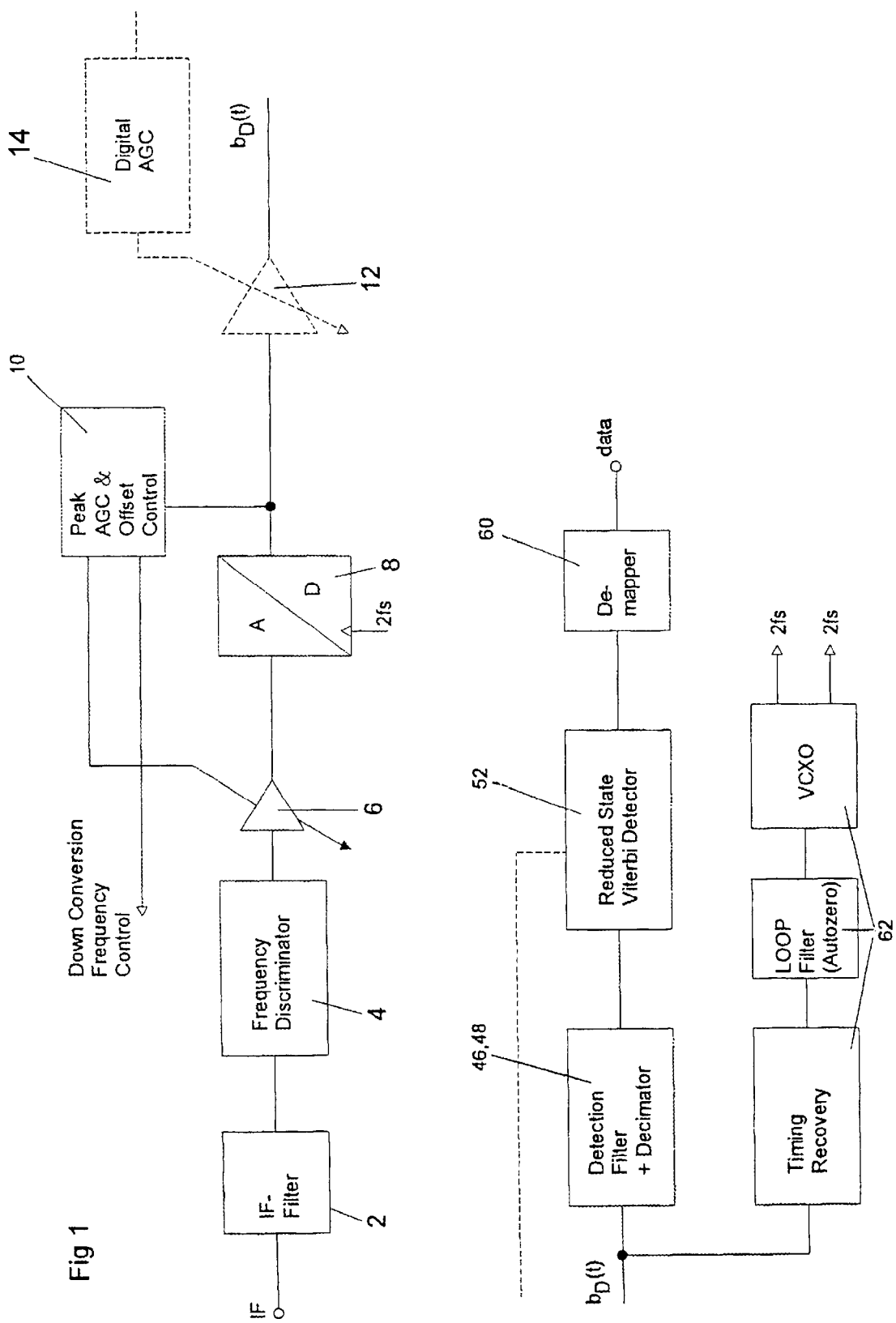
FIG. 1 shows a block diagram of an inventive detector arrangement for CPM-modulated information symbols whereby a frequency discriminator is used as a demodulator.

FIG. 1 illustrates a circuit of a receiver having a frequency discriminator, in which an intermediate frequency signal IF supplied from a mixer (not shown) is applied through an intermediate frequency filter 2 to a frequency discriminator 4 for demodulation. The demodulated signal passes through a gain controllable amplifier 6 and is applied to an analog-to-digital converter 8 for sampling at a sampling frequency of 2fs with the samples being digitized. A control signal generator 10 derives, from the digitized signal, control signals for controlling the frequency of the local oscillator and for gain control of amplifier 6. If desired, the digitized signal can be fed through another gain controlled amplifier 12 which receives a gain control voltage from a control voltage circuit or digital automatic gain control circuit 14 and supplies at its output the demodulated signal $b_D(t)$.

Figure 2:
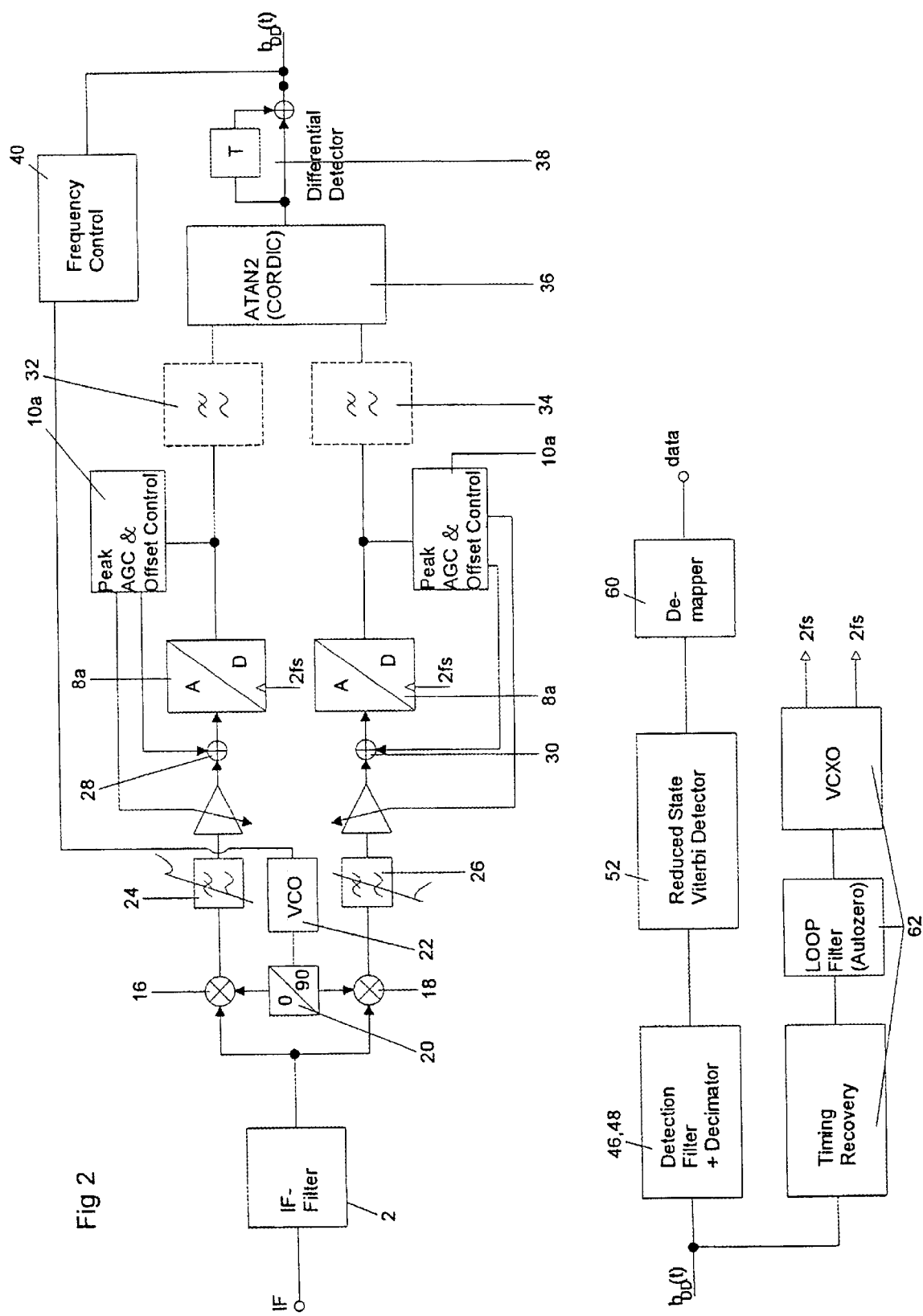
FIG. 2 shows a block diagram of an inventive demodulator arrangement with differential demodulation.

The circuit illustrated in FIG. 2 uses differential demodulation rather than a frequency discriminator. The signal supplied from IF filter 2 is demodulated by two respective mixers 16 and 18 against two quadrature phases of an oscillator wave generated by a variable control oscillator 22 and split in 90° shifted phases by a phase splitter 20, the demodulated signal phases being applied through respective filters 24 and 26 and gain controlled amplifiers 6a to respective offset correction circuits 28 and 30, which receive, like amplifier 6a, correction signals from control signal generators 10a. The corrected signals then are sampled like in the case of FIG. 1 by means of analog-to-digital converters 8a at a sampling frequency of 2fs, and then digitized.

After being additionally filtered, if desired, by respective filters 32 and 34, phase samples are derived by means of a calculator circuit 36 from the samples of the respective in-phase and quadrature channels. Those phase samples are applied to a differential detector 38 which produces a demodulated signal $b_{DD}(t)$. From this signal, a control signal for oscillator 22 is derived by means of frequency control circuit 40.

The now described portion of the circuit for detecting the information symbols is the same in FIGS. 1 and 2 and will now be described in more detail for explaining the invention.

For the moment, the color of the noise after demodulation (by frequency discriminator or frequency detector) can be ignored. The transmission is now interpreted as pulse amplitude modulation (PAM) with the base pulses $g_D(t)$ and $g_{DD}(t)$, respectively, and the additive noise will be assumed as white noise. It is well-known that in this case the optimum system for the conversion from continuous-time to discrete-time is a matched filter followed by a baud rate sampler. (A whitened matched filter is also applicable, cf., G. D. Forney, Jr., *Maximum-Likelihood Sequence Estimation of Digital Sequencies in the Presence of Intersymbol Interference* in IEEE Transactions on Information Theory, Vol. IT-18(3): 363–378, May 1972), incorporated herein by reference.

Figure 3:
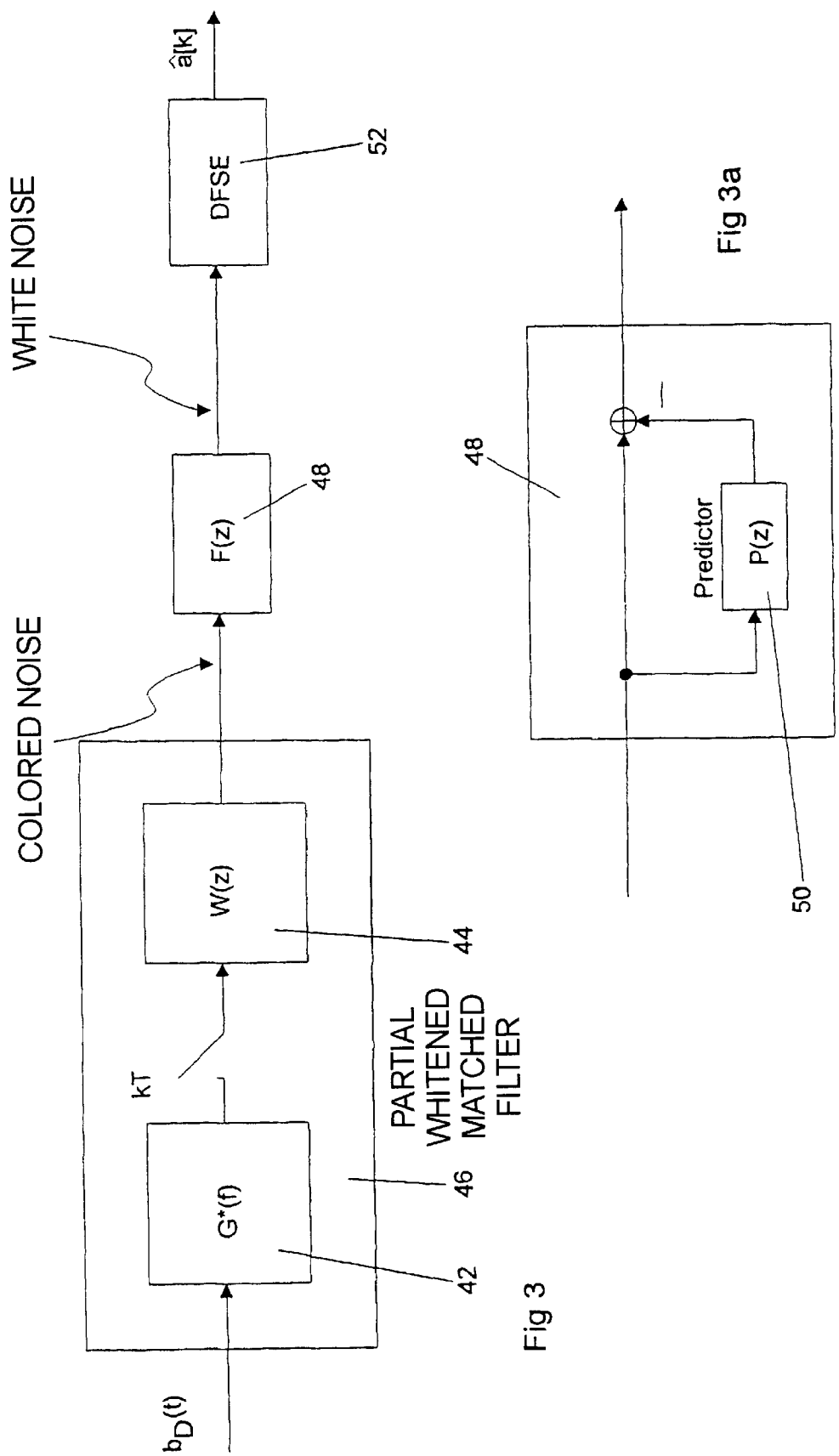
FIG. 3 shows an inventive filter to be used in the circuits according to FIGS. 1 and 2.

FIG. 3 illustrates the so-defined whitened matched filter. The transfer function of the matched filter is $G^*(f)$, where $G(f)$ is the Fourier transform of the frequency modulating pulse $g(t)$. For PAM transmission the additive noise at the matched filter output (after baud rate sampling) has power spectral density $$S_{dd}(e^{j2\pi fT}) = \frac{1}{T}\sum_{k=-\infty}^{\infty}\left|G\left(f - \frac{k}{T}\right)\right|^2. \qquad (1.5)$$

The whitening filter $W(z)$, that yields white noise at its output is defined by the fact that its power transfer function must equal the inverse of the power spectral density $$S_{dd}^{-1}(e^{j2\pi fT}).$$

For the following, assume a minimum phase whitened matched filter which has an impulse response whose energy is concentrated on the first few taps. It will be shown that this is essential for the application of reduced-state sequence estimation algorithms. The whitened matched filter's impulse response can be derived from equation (1.5) using spectral factorization. The response of the minimum phase whitened matched filter to the pulse $g(t)$ is denoted as $d[k]$, where coefficients should be normalized to give $d[0]=1$.

In contrast to ordinary PAM transmission over the AWGN channel, colored noise at the frequency discriminator output in the case of CPM transmission must be dealt with. Thus, also the noise $n[k]$ at the output of the whitened matched filter is colored because this filter has been designed to yield white noise for PAM transmission. Because of this difference this filter will be called in the following as a "Partial Whitened Matched Filter" (PWMF) 46. The color of the noise at the whitened matched filter output is determined by the IF filter, the discriminator, and the PWMF. The inventive method uses this colored noise in order to greatly enhance the performance of non-coherent CPM receivers.

The invention recognizes that the color $n[k]$ of the noise means that the noise power can be reduced by applying a whitening filter $F(z)$. The calculation of the whitening filter's 48 coefficients is based on the correlation of successive noise samples. This correlation implies that an estimate for the current noise sample can be calculated using only previous noise samples. Subtracting this estimate from the current received value will yield a reduced noise power and an estimate for the useful signal which will be more accurate in the mean.

The whitening filter $F(z)$ 48 can be expressed using a predictor filter $P(z)$ 50. The relation between the whitening and predictor filter is $F(z)=1-P(z)$, see FIG. 3a.

The coefficients of the predictor filter are chosen so that the noise power at the output of the whitening filter $F(z)$ is minimized. Assuming an FIR whitening filter of order P, the criterion of minimum noise power at the whitening filter output can be formulated as:

$$\min_{p[i]} E\left\{\left|n[k] - \sum_{i=1}^{P} p[i]n[k-i]\right|^2\right\} \qquad (1.6)$$

where $p[k]$ denotes the predictor coefficients. The coefficient $p[0]$ of the predictor filter must be zero because of causality reasons. Minimization of the noise power leads to the Yule-Walker equations as conditions for the optimum predictor coefficients:

$$\sum_{i=1}^{P} p[i]R_{nn}[k-i] = R_{nn}[k] \qquad k=1,2,\ldots,P, \qquad (1.7)$$

where $R_{nn}[k]$ is the auto-correlation function of the noise at the PWMF output. Solution of the equation system (1.7) leads to the predictor coefficients which minimize the noise power for a given predictor order P. The whitening filter 48 coefficients are calculated from the predictor coefficients as follows:

$$f[k] = \begin{cases} 1; & k=0 \\ -p[k]; & k>0 \end{cases} \qquad (1.8)$$

Now, the impulse response of the system $H(z)$ up to the whitening filter $F(z)$ can be given as $$h[k]=d[k]*f[k], \qquad (1.9)$$

where * denotes convolution. For sufficiently large predictor order P, the noise at the output of the whitening filter $F(z)$ 48 is essentially white. The noise power is minimal for the given predictor order P.

On the other hand, the impulse response $h[k]$ extends over many symbol intervals and, therefore, causes strong intersymbol interference. As is well known, the optimum equalization of intersymbol interference in the presence of additive white noise consists of a maximum-likelihood sequence estimation (MLSE) with the squared Euclidean distance as metric. MLSE is implemented efficiently by means of the Viterbi algorithm.

In order to achieve a large reduction of noise variance, the order of the whitening filter 48 must be sufficiently large. Furthermore, the convolution of the whitening filter impulse response with the PWMF impulse response yields an even longer response $h[k]$.

The expense for the Viterbi algorithm grows exponentially with the length of the impulse response which is to be equalized. The number of states of the Viterbi algorithm is $M^L$, where M is the number of symbols of the symbol alphabet and L denotes the order of the impulse response $h[k]$. For values of L in the range $5 \leq L \leq 20$, which are of importance in realizations, the Viterbi algorithm cannot be implemented in practice at least for multi-level modulation schemes.

An improvement of the invention, therefore, includes the substitution of the Viterbi algorithm by a sequence estimation algorithm with a reduced number of states in order to get rid of intersymbol interference introduced by the response $h[k]$. This is illustrated by sequence estimator means 52. Despite the drastically reduced expense, the degradation of reduced-state sequence estimation compared to MLSE is small, as long as the impulse response to be equalized is of minimum phase as described above.

A variety of different methods can be applied to achieve a reduced number of states: very simple methods, cf., *Delayed Decision-Feedback Sequence Estimation* by A. Duel and D. Heegard in Proceedings of the 23rd annual Allerton Conference on Communications Contr. Comput., October 1985, incorporated herein by reference, but also very elaborate methods, which guarantee the at-most possible minimum Euclidean distance and thus guarantee the ultimately possible power efficiency for a given number of states, cf., *Design of Hyper States for Reduced-State Sequence Estimation* by B. E. Spinnler and J. B. Huber in International Journal of Electronics and Communications (AEÜ), Vol. 50: Jan. 17–26, 1996, incorporated herein by reference.

In any case, the possibility to freely choose the number of states of the sequence estimation allows for the trading of complexity of the receiver for performance. Usually, already M states are sufficient to realize most of the possible gain. With this detection scheme, it is possible with binary modulation to approach the power efficiency of the optimum coherent receiver up to less than one decibel. Also, with multi-level modulation schemes a very good power efficiency can be achieved.

For reduced-state sequence estimation with only one stage, the sequence estimation becomes decision feedback equalization. In this case, calculation effort can be further reduced by implementing the decision feedback equalization in the noise prediction structure, see K. P. Graf and J. Huber, *Design and Performance of an All-Digital Adaptive* 2.048 *Mbit/s Data Transmission System Using Noise Prediction* in Proceedings of the ISCAS'89, pages 1808–1812, 1989, incorporated herein by reference. This structure collapses the prediction filter and the (in this case) identical feedback filter of the decision feedback equalization into a single filter and the amount of computational complexity is reduced.

Figure 4:
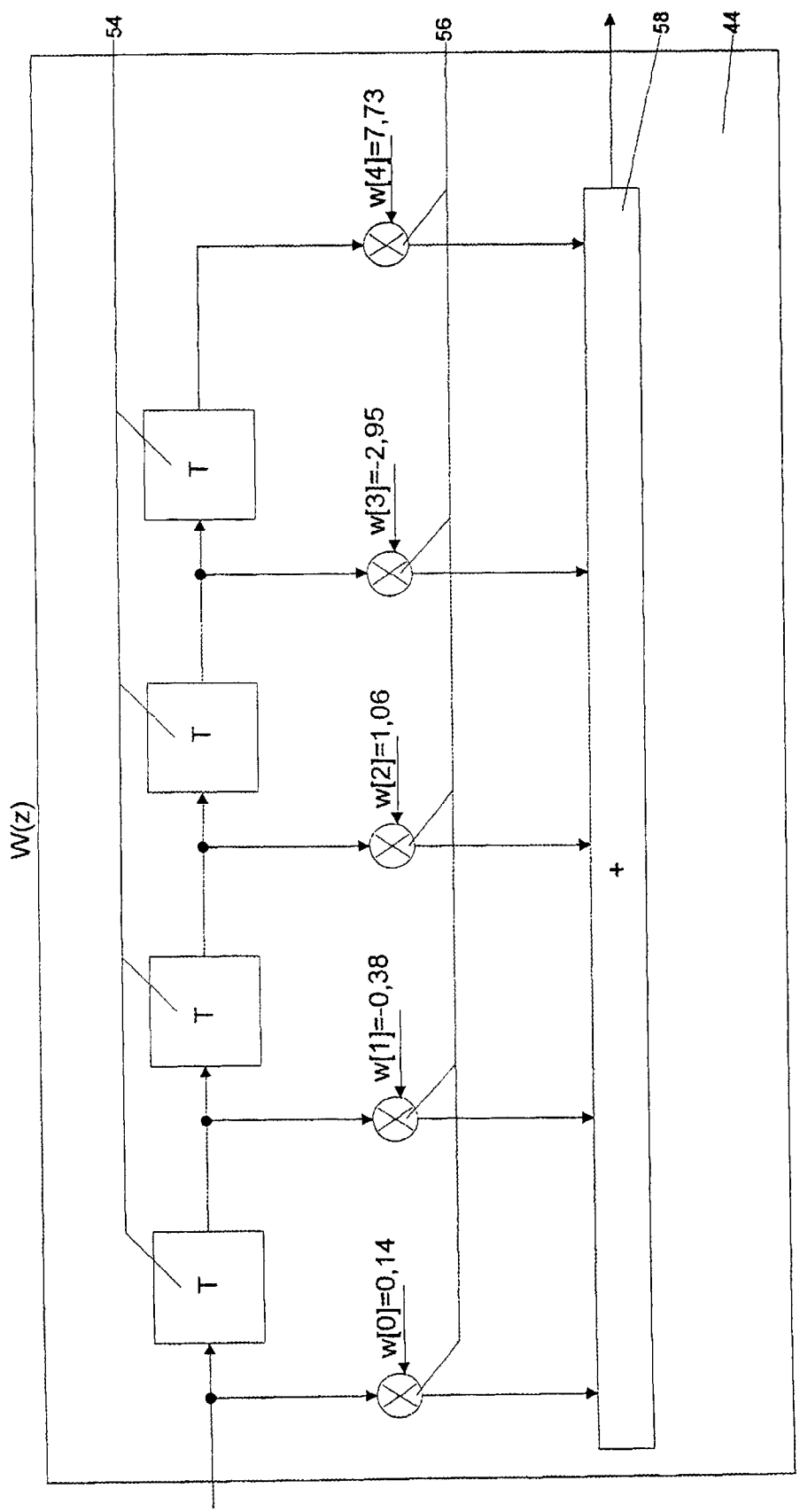
FIG. 4 shows a particular embodiment of a whitening filter W(z) in the form of an FIR filter.
Figure 5:
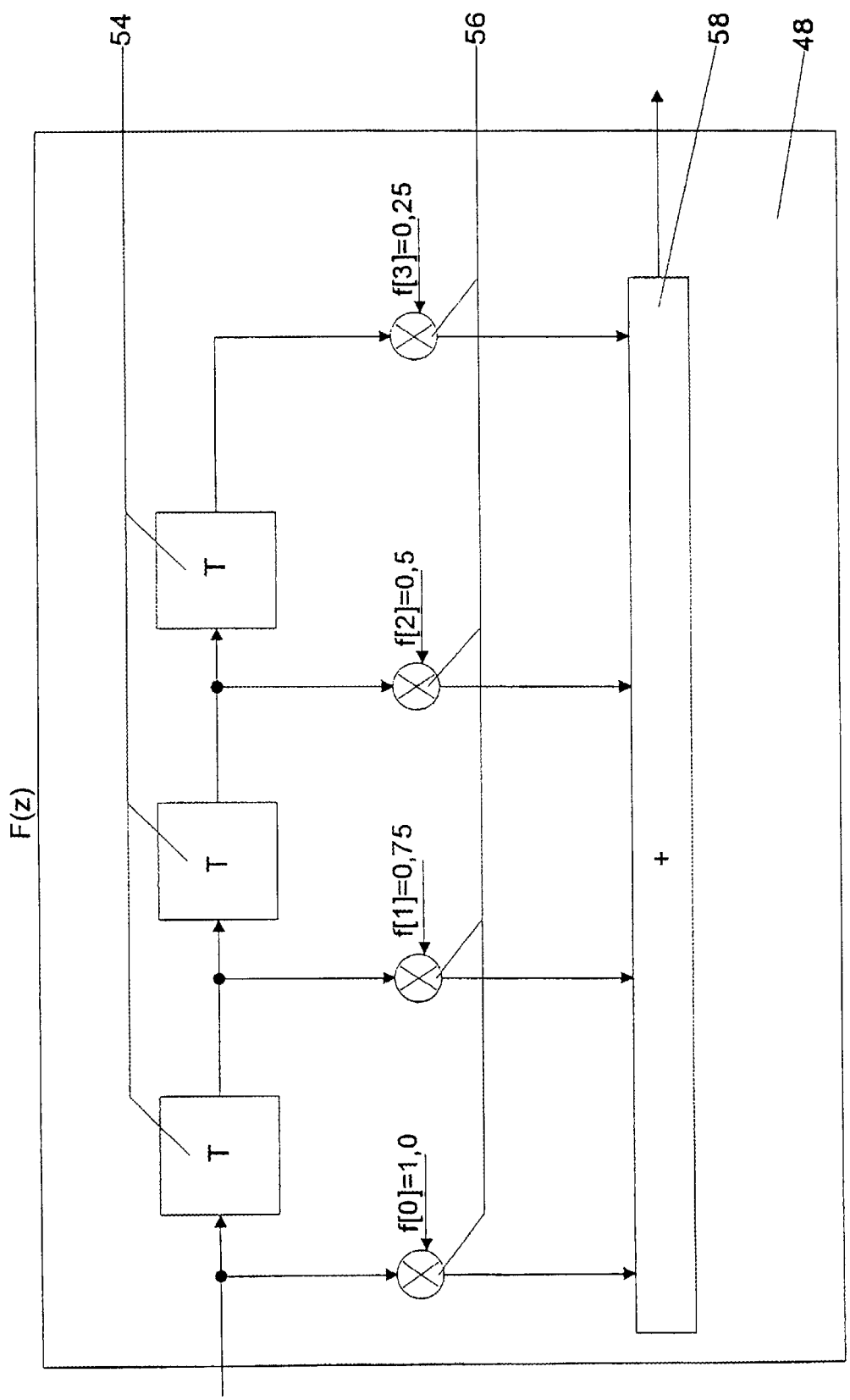
FIG. 5 shows a particular embodiment of a whitening filter F(z) n the form of an FIR filter.

An example for an embodiment of the whitening filter W(z) 44 in form of an FIR filter is shown in FIG. 4. A corresponding FIR embodiment of whitening filter F(z) 48 is shown in FIG. 5. The signal is applied to a series of delay elements 54 with the input and output signals thereof being fed through multiplying means 56 to a summing circuit 58 supplying a filtered output signal as the sum of a number of time-delayed and differently weighted partial signals. the output signal of filter 44, filtered by W(z), contains colored noise which is converted by filtering with F(z) into approximately white noise. This output signal of filter 48 is then applied to sequence estimator means 52. According to FIGS. 1 and 2, a demapper circuit 60 follows which then supplies the finally detected data.

FIGS. 1 and 2 further show a known clock generator 42 for generating the sampling clock signals 2fs for the analog-to-digital converters.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for detecting CPM-modulated information symbols, comprising the steps of:
   transmitting CPM signals through an AWGN channel;
   incoherently demodulating the CPM signal by a frequency discriminator into a signal $b_D(t)$ or by differential demodulation into a signal $b_{DD}(t)$;
   passing the demodulated signal through a partially whitened matched filter; sampling the demodulated signal with a symbol clock after having passed through the whitened matched filter,
   wherein,
   the signal is subject to only partial whitened matched filtering, whereby signal pulses decrease at the expense of a rest of colored noise remaining.

2. The method according to claim 1, wherein the filtered signal is subject to further whitening filtering with a filter function F(z)=1−P(z), whereby the remaining color of the noise is approximately compensated into white noise, with P(z) being a noise estimate predictor filter function having its coefficiens selected for minimizing the noise power such that from previous noise samples a current noise estimate will be calculated which is to be subtracted from the signal.

3. The method according to claim 1, wherein the filtered signals containing approximately white noise are subject to a sequence estimation with reduced number of states.

4. The method according to claim 3, wherein by reducing the number of states to a single state a decision feedback equalization is made whereby a prediction filter is also used as decision feedback filter.

5. The method according to claim 1, wherein the whitening filtering is performed by an FIR filter of the order P, meeting the requirement $$\min_{p[i]} \cdot E\left\{\left|n[k] - \sum_{i=1}^{P} p[i]n[k-i]\right|^2\right\}$$

and having coefficients $$f[k] = \begin{cases} 1; & k = 0 \\ -p[k]; & k > 0 \end{cases}$$

and being calculated from optimal prediction filter coefficients p[k] which meet the condition $$\sum_{i=1}^{P} p[i]R_{nn}[k-i] = R_{nn}[k] \quad k = 1, 2, \ldots, P$$

where $R_{nn}[k]$ is an autocorrelation function of the noise at the output of the partial whitened matched filter.

6. An apparatus for detecting CPM-modulated information symbols, comprising:
   a signal source containing an AWGN channel transmitting CPM signals modulated with information signals and containing a demodulator for said CPM signals, and
   downstream of said signal source, a whitened matched filter for said demodulated signals and a signal sampler following said whitened matched filter and operating with the signal clock, said filter being a partial whitened matched filter dimensioned such that it supplies at its output finite response pulses accompanied by remaining colored noise.

7. The apparatus according to claim 6, wherein said partial whitened matched filter is followed by a further whitened filter having a filter function F(z) selected such that the colored noise in its input signal is converted into approximately white noise in its output signal.

8. The apparatus according to claim 7, wherein said further whitening filter is characterized by the filter function F(z)=1−P(z), whereby P(z) is the filter function of a predictor filter having its coefficients selected such that for minimizing the noise power at the output of said further whitening filter a current noise estimate to be subtracted from said signal is being derived from previous noise samples.

9. The apparatus according to claim 8, characterized in that said whitening filter is an FIR filter of the order P, meeting the requirement $$\min_{p[i]} E\left\{\left|n[k] - \sum_{i=1}^{P} p[i]n[k-i]\right|^2\right\}$$

and having its coefficients $$f[k] = \begin{cases} 1; & k = 0 \\ -p[k]; & k > 0 \end{cases}$$

and calculated from optimal predictor filter coefficients p[k] which meet the requirement $$\sum_{i=1}^{P} p[i]R_{nn}[k-i] = R_{nn}[k] \quad k = 1, 2, \ldots, P,$$

where $R_{nn}[k]$ is an autocorrelation function of the noise at the output of said whitened matched filter.

10. The apparatus according to claims 7, 8 or 9, wherein said whitening filter is followed by means for sequence estimation with reduced number of states.

11. The apparatus according to claim 10, wherein the number of states is 1 and said means is integrated in said whitening filter.

12. The method according to claim 2, wherein the filtered signals containing approximately white noise are subject to a sequence estimation with reduced number of states.

13. The method according to claim 12, wherein by reducing the number of states to a single state a decision feedback equalization is made whereby the prediction filter is also used as decision feedback filter.

14. The method according to claim 2, wherein the whitening filtering is performed by an FIR filter of the order P, meeting the requirement $$\min_{p[i]} \cdot E\left\{\left|n[k] - \sum_{i=1}^{P} p[i]n[k-i]\right|^2\right\}$$

and having coefficients $$f[k] = \begin{cases} 1; & k = 0 \\ -p[k]; & k > 0 \end{cases}$$

and being calculated from optimal prediction filter coefficients p[k] which meet the condition $$\sum_{i=1}^{P} p[i]R_{nn}[k-i] = R_{nn}[k] \quad k = 1, 2, \ldots, P$$

where $R_{nn}[k\}$ is an autocorrelation function of the noise at the output of the partial whitened matched filter.

* * * * *